(12) United States Patent
Chen et al.

(10) Patent No.: US 8,583,961 B2
(45) Date of Patent: Nov. 12, 2013

(54) METHOD AND DEVICE FOR CREATING PATTERN MATCHING STATE MACHINE

(75) Inventors: Jian Chen, Shenzhen (CN); Qikun Wei, Shenzhen (CN); Guohai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 817 days.

(21) Appl. No.: 12/781,650

(22) Filed: May 17, 2010

(65) Prior Publication Data

US 2010/0229040 A1    Sep. 9, 2010

Related U.S. Application Data

(63) Continuation of application No. PCT/CN2009/070076, filed on Jan. 8, 2009.

(30) Foreign Application Priority Data

Feb. 1, 2008    (CN) .......................... 2008 1 0006076

(51) Int. Cl.
  *G06F 11/00*    (2006.01)
(52) U.S. Cl.
  USPC ............................................. 714/27; 707/749
(58) Field of Classification Search
  USPC ........................................................ 714/27
  See application file for complete search history.

(56) References Cited

U.S. PATENT DOCUMENTS

| | | | |
|---|---|---|---|
| 7,082,044 B2 * | 7/2006 | Gould et al. ................. | 365/49.1 |
| 7,219,319 B2 * | 5/2007 | Gould et al. ..................... | 326/46 |
| 7,301,792 B2 * | 11/2007 | Gould et al. ................ | 365/49.15 |
| 8,260,799 B2 * | 9/2012 | Chen et al. ..................... | 707/758 |
| 2005/0195832 A1 * | 9/2005 | Dharmapurikar et al. ......................... | 370/395.31 |
| 2006/0020595 A1 | 1/2006 | Norton et al. | |
| 2006/0253816 A1 * | 11/2006 | Gould et al. ...................... | 716/5 |
| 2007/0192286 A1 * | 8/2007 | Norton et al. ...................... | 707/2 |
| 2007/0233628 A1 * | 10/2007 | Sherwood et al. ............... | 706/46 |
| 2011/0016142 A1 * | 1/2011 | Chen et al. ..................... | 707/758 |
| 2011/0167030 A1 * | 7/2011 | Bremler-Barr et al. ......... | 706/48 |

FOREIGN PATENT DOCUMENTS

| | | |
|---|---|---|
| CN | 1292568 C | 12/2006 |
| CN | 1980240 A | 6/2007 |
| GB | 2437560 A | 10/2007 |

OTHER PUBLICATIONS

Fang et al., *Microcomputer Information* 23 (3-3): 211-213, 2007.
Li et al., *Journal of Software*, 17 (12): 2403-2415 (2006).
Written Opinion of the International Searching Authority in corresponding PCT Application No. PCT/CN2009/070076 (Apr. 23, 2009).
Aho et al., "Efficient String Matching: An Aid to Bibliographic Search," Programming Techniques, Jun. 1975, vol. 18, No. 6, Association for Computing Machinery, Inc., Bedford, Massachusetts.

* cited by examiner

*Primary Examiner* — Kamini Patel
(74) *Attorney, Agent, or Firm* — Leydig, Voit & Mayer, Ltd.

(57) ABSTRACT

A method and a device for creating a pattern matching state machine are provided. The method includes: obtaining a predefined keyword set; generating a Goto function according to the keyword set; constructing a Failure function according to the generated Goto function, and setting that an acceptable input set of the Failure state of each state is not a subset of an acceptable input set of the state, where the acceptable input set of the state indicates that when any symbol within the symbol set is input in the state, the Goto function of the state does not fail; and generating an Output function according to the Goto function and the Failure function.

12 Claims, 7 Drawing Sheets

(a)

(b)

(c)

(d)

METHOD AND DEVICE FOR CREATING PATTERN MATCHING STATE MACHINE

CROSS-REFERENCE TO RELATED APPLICATIONS

The application is a continuation of International Application No. PCT/CN/2009/070076, filed on Jan. 8, 2009, which claims priority to Chinese Patent Application No. 200810006076.X, filed on Feb. 1, 2008, both of which are hereby incorporated by reference in their entireties.

FIELD OF THE TECHNOLOGY

The present invention relates to a pattern matching technology, and more particularly to a method and a device for creating a pattern matching state machine.

BACKGROUND OF THE INVENTION

The pattern matching usually refers to searching for pre-defined keywords in text data. The pattern matching problem is a basic problem in computer science, and the research content has important values in many fields, for example, information retrieval and pattern identification, and plays an important role in applications such as spell check, language translation, data compression, search engine, intrusion detection, content filtering, computer virus feature code matching, and gene sequence comparison. For example, in some information acquisition and text editing applications, a user may designate some keywords, so that the positions of the keywords can be quickly positioned in the text.

The Aho-Corasick algorithm is simple and effective, in which all the positions of a finite number of keywords can be located in any text. The principle of the algorithm is as follows: firstly a finite state pattern matching machine is defined according to the series of keywords, and then the text is used as an input to the pattern matching machine. As long as the keywords are matched, it is notified that the keyword matching is successful.

For example, a user designates a keyword set {he, she, his, hers}, and the user desires that once any keyword occurs in the text search, a search result is output and notified to the user. As shown in FIG. 1, a procedure of performing the pattern matching through the Aho-Corasick algorithm is described in the following. A Goto function, a Failure function, and an Output function are generated according to the keyword set {he, she, his, hers} in two steps: in a first step, a state and the Goto function are confirmed, and in a second step, the Failure function is computed. The construction of the Output function is started in the first step, and is completed in the second step.

As shown in FIG. 1(a), the Goto function is generated according to the keyword set (in formulas, g represents the Goto function).

The Goto function g decides a Goto state according to a current state and an input symbol. For example, when h is input in 0 state, 0 state goes to 1 state, which is represented by g(0, h)=1; when h is input in state 3, state 3 goes to state 4, which is represented by g(3, h)=4. If a certain symbol is input in a certain state, and the goto is unsuccessful, it indicates that the Goto function fails, and a result is represented by fail; for example, e is input in state 3, and the Goto function fails, it is represented by g(3, e)=fail.

The Output function indicates an output result when the matching in the certain state is successful, for example, Output(2)="he".

To construct the Goto function, a Goto directed graph is constructed. The directed graph begins with one vertex which represents an initial state 0. Then, the keywords are input into the directed graph, and a path that begins from the initial state is added. New vertices and edges are added to the directed graph when the path is added, so that beginning from the initial state, a path spells out a complete keyword. The path terminates in the certain state, and the state is added to the Output function.

It is assumed that {he, she, his, hers} is the keyword set, and a procedure of generating the finite state machine is as shown in FIG. 2.

A first keyword "he" is added to the directed graph, and a result as shown in FIG. 2a is obtained. The keyword "he" is spelt from state 0 to state 2, and the output "he" is associated with state 2, that is, Output(2)={he}.

A second keyword "she" is added to the directed graph, and FIG. 2b is obtained. The output "she" is associated with state 5, that is, Output(5)={she}.

A third keyword "his" is added to the directed graph, and a result as shown in FIG. 2c is obtained.

It should be noted that when the keyword "his" is added, an edge labeled h from state 0 to state 1 already exists, so it is unnecessary to add another edge labeled h from state 0 to state 1. The output "his" is associated with state 7, that is, Output(7)={his}.

The last keyword "hers" is added, and a result as shown in FIG. 2d is obtained. The output "hers" is associated with state 9, that is, Output(9)={hers}. In the adding procedure, the existing edge labeled h (from state 0 to 1) and the existing edge labeled e (from state 1 to 2) may be used.

To complete the construction of the Goto function, a loop needs to be added, in which the loop is from state 0 to state 0 and corresponds to all input symbols other than h or s. The obtained result is shown in FIG. 1(a).

The Failure function (represented by f in formulas) represents which state should be jumped to for continuing the matching when the Goto function fails in a certain state. As shown in FIG. 1(b), in state 5, when an r symbol is input, g(5, r)=fail, and f(5)=2 is called for processing, that is, state 5 firstly jumps to state 2, and then g(2,r) is invoked for processing. The reason is that the Failure function represents the goto from a state to another state, which is equivalent to adding a link between the two states, and usually the direction of the Failure function in a certain state is called a Failure link of the state.

The Failure function is constructed based on the Goto function. Firstly, the depth of state s in the goto directed graph, that is, a length of the shortest path from the initial state to s, is defined. In FIG. 1(a), the depth of the initial state is 0, the depth of states 1 and 3 is 1, and the depth of states 2, 4, and 6 is 2, and so on.

An algorithm of computing the Failure function f in a state is as follows. Firstly, the Failure state of all states having the depth of 2 is computed, and then the Failure state of all states having the depth of 2 is computed, until the Failure state has been computed for all states. Thus, the Failure function of the state machine is constructed.

The Failure state of all states having the depth of 1 is set to 0. It is assumed that the Failure state of all states having the depth smaller than d is already computed, the Failure function of state s having the depth of d can be deduced from non-fail values of the Goto function of the states having the depth of d-1.

Firstly, each state r having the depth of d-1 is considered, and the following processing is executed.

1. If g(r.a)=fail for all input symbols a, the processing of state r is terminated.

2. Otherwise, for the situation that each input symbol a generates the output g(r.a)=s, the following operations are executed.

(a) A state variable state=f(r) is set.

(b) A formula state←f(state) (e.g. the f(state) is assigned to the state variable state) is executed for zero or more times, until a value of state satisfies g(state, a)≠fail (since g(0,a)≠fail, the appropriate value of the state will always be found.).

(c) f(s)=g (state, a) is set.

For example, in order to compute the Failure function in FIG. 1(a), f(1)=f(3)=0 is firstly set, because 1 and 3 are the states having the depth of 1. Then, the Failure function of the states 2, 4 and 6 having the depth of 2 is computed.

To compute f(2), state=f(1)=0 is set; and since g(0, e)=0, f(2)=0.

To compute f(6), state=f(1)=0 is set; and since g(0, i)=0, f(6)=0.

To compute f(4), state=f(3)=0 is set; and since g(0, h)=1, f(4)=1.

Through the computation according to the ideas, the complete Failure function is obtained, as shown in FIG. 1(b).

During the computation of the Failure function, the Output function is updated. When it is confirmed that f(s)=s', and states s and s' are both the Output state, the output set of s' is combined with the output set of state s. For example, according to FIG. 1(a), it is confirmed that f(5)=2. At this point, the output set of state 2, namely {he}, is combined with the output set of state 5, so as to obtain a new output set {he, she}. The final Output function is as shown in FIG. 1(c).

In the following, the matching procedure of the state machine is further described with an example.

For example, a text "sshe" is input for searching. When the first s is input, g(0, s)=3, so the state goes to state 3. When a second s is input, the Goto function fails, g(3, s)=fail, so the Failure function is called, and f(3)=0 indicates that the state jumps to state 0, and then g(0, s)=3, so that the current state is still state 3. When h is input, g(3, h)=4, and the state goes to state 4. When e is input, g(4, e)=5, and the state goes to state 5. Since Output(5)={she, he}, during the search, two keywords {she, he} predefined by the user are found.

In the implementation of the present invention, the inventors find that the existing Aho-Corasick algorithm at least has the following problem. That is, after Failure reaches a certain state, the Goto function still fails sometimes, and Failure needs to jump to other states. That is, the existing Aho-Corasick algorithm has low efficiency in processing the Failure links, and has many low efficient Failure links.

The complicated state machine as shown in FIG. 3 is taken as an example, in which dashed lines represent the Failure links, q0 indicates the initial state. For example, in q14 state, g(q14, e)=fail, so it jumps to state q27 according to f(q14)=q27. However, in state q27, g(q27, e)=fail, so it jumps to f(q27)=q19. However, g(q19, e)=fail, so it jumps to f(q19)=q0, that is, through g(q14, e)→f(q14)→g(q27, e)→f(q27)→g(q19, e)→f(q19), it jumps to q0 state.

Referring to FIG. 4, the low efficient Failure links are shown, f(q6)=q0, f(q5)=q4, f(q4)=q3, f(q3)=q2, f(q2)=q1, and f(q1)=q0. If a symbol c is input in state q4, g(q4, c)=fail, it jumps to state q3 according to f(q4)=q3. However, g(q3, c)=fail, it jumps to state q2 according to f(q3)=q2. However, g(q2, c)=fail, it jumps state q1 according to f(q2)=q1. However, g(q1, c)=fail, it jumps to the initial state q0 according to f(q1)=q0. Till now, the jump of the Failure links ends, and through g(q4, c)→f(q3)→g(q3, c)→f(q2)→g(q2, c)→f(q1)→g(q1, c)→q0, it jumps to the q0 state.

It may be known that the Aho-Corasick algorithm has low efficiency in processing the Failure links, and has many low efficient Failure links.

SUMMARY OF THE INVENTION

The present invention is directed to a method and a device for creating a pattern matching state machine, so as to reduce low efficient Failure links in a pattern matching procedure, and improve a pattern matching processing efficiency.

In an embodiment, the present invention provides a method for creating a pattern matching state machine, which includes the following steps.

A predefined keyword set is obtained.

A Goto function is generated according to the keyword set.

A Failure function is constructed according to the generated Goto function, and it is set that an acceptable input set of a Failure state of each state is not a subset of an acceptable input set of the state, in which the acceptable input set of the state indicates that when any symbol within the symbol set is input in the state, the Goto function of the state does not fail.

An Output function is generated according to the Goto function and the Failure function.

In an embodiment, the present invention further provides a device for creating a pattern matching state machine, which includes an obtaining unit, a Goto function generating unit, a Failure function generating unit, and an Output function generating unit.

The obtaining unit is adapted to obtain a predefined keyword set.

The Goto function generating unit is adapted to generate a Goto function according to the keyword set.

The Failure function generating unit is adapted to construct a Failure function according to the generated Goto function, and set that an acceptable input set of a Failure state of each state is not a subset of an acceptable input set of the state, in which the acceptable input set of the state indicates that when any symbol within the symbol set is input in the state, the Goto function of the state does not fail.

The Output function generating unit is adapted to generate an Output function according to the Goto function and the Failure function.

It is known from the technical solutions of the embodiments of the present invention that, with the method and the device for creating the pattern matching state machine according to the embodiments of the present invention, when the Failure function is constructed, it is determined whether the acceptable input set of the Failure state of a certain state is the subset of the acceptable input set of the state, and if yes, the Failure state is not used as the Failure state of the state, but a Failure state of the Failure state is continually searched for determination, until an appropriate state is found as the Failure state of the state, thereby eliminating the low efficient Failure links in the art, and improving the pattern matching processing efficiency.

DETAILED DESCRIPTION OF THE EMBODIMENTS

In order to make persons skilled in the art understand the solutions of the present invention better, the present invention is further described in detail below with reference to some exemplary embodiments and the accompanying drawings.

Figure 5:
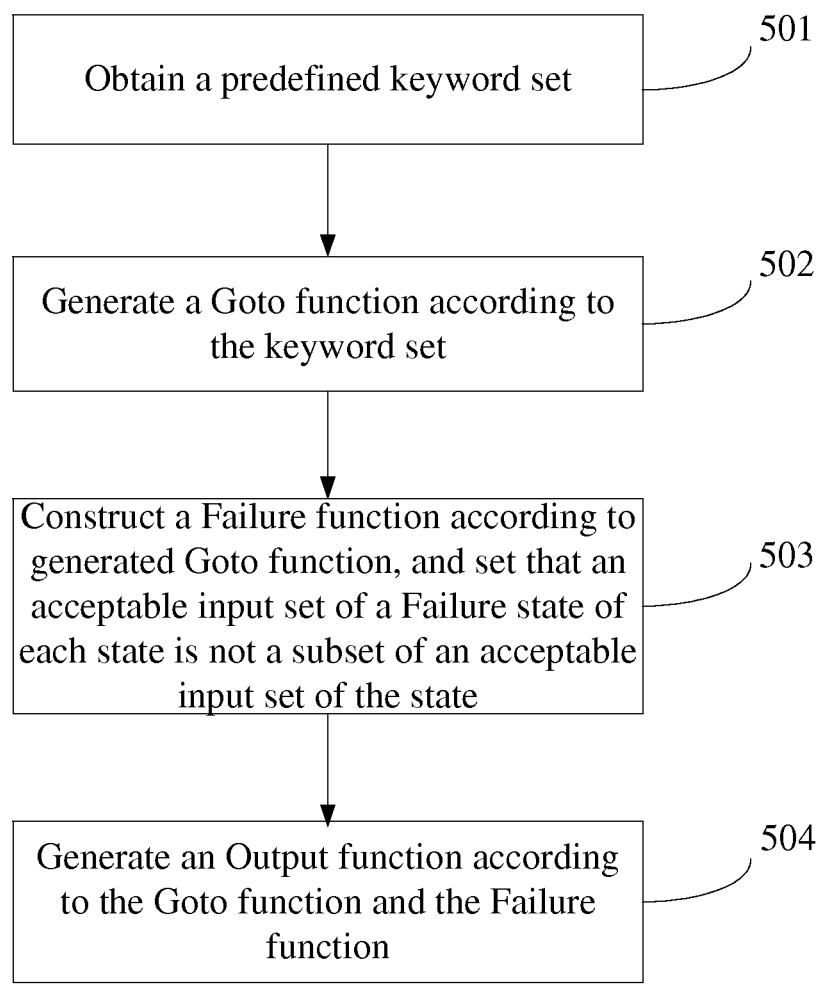
FIG. 5 is a flow chart of a method for creating a pattern matching state machine according to an embodiment of the present invention.

FIG. 5 is a flow chart of a method for creating a pattern matching state machine according to an embodiment of the present invention. Referring to FIG. 5, the method includes the following steps.

In step 501, a predefined keyword set is obtained.

In step 502, a Goto function is generated according to the keyword set.

A procedure of generating the Goto function is similar to that in the art, so it is not described in detail here.

In step 503, a Failure function is constructed according to the generated Goto function, and it is set that an acceptable input set of a Failure state of each state is not a subset of the acceptable input set of the state, where the acceptable input set of the state indicates that when any symbol within the symbol set is input in the state, the Goto function of the state does not fail.

That is, when the Failure function is constructed, if $f(s)=s'$, but the acceptable input set of state s' is the subset of the acceptable input set of state s, state s' cannot be used as a Failure state of state s, and it is necessary to continue searching the Failure state of state s' for determination, until an appropriate state is found as the Failure state of state s.

In an actual implementation, it is needed to determine whether the acceptable input set of state s' is the subset of the acceptable input set of state s by determining whether a symbol b making $g(s', b)\neq fail$, but $g(s, b)=fail$ exists. If the symbol b exists, the acceptable input set of state s' is not the subset; otherwise, the acceptable input set of state s' is the subset.

In step 504, an Output function is generated according to the Goto function and the Failure function.

A procedure of generating the Goto function is similar to that in the art, and it is not described in detail here.

During the actual implementation, the Failure function may be constructed according to the generated Goto function according to the following procedure.

Firstly, a Failure state of all states having a depth of 1 is set to an initial state 0; then, the Failure state of all states having a depth of 2 is computed according to the Failure state of the states having the depth of 1; then, the Failure state of all states having a depth of 3 is computed according to the Failure state of the states having the depth of 2, and so on, until the Failure states of all the states are computed (except that the Failure state of the initial state 0 is not defined). Thus, the Failure function is already constructed.

Firstly, the Failure state of all the states having the depth of 1 is set to 0. Here, it is assumed that the Failure state of all the states having the depth smaller than d is computed, the Failure state of the state having the depth of d may be deduced from non-fail values of the Goto function of the state having the depth of d-1.

In order to compute the Failure function of state s having the depth of d, each state r having the depth of d-1 is considered, and the following are performed.

1. If $g(r.a)=fail$ for all input symbols a, the processing of state r ends.

2. Otherwise, for the situation that each input symbol a generates the output $g(r.a)=s$, the following operations are performed.

(a) A state variable state=f(r) is set.

(b) The formula state←f(state) is executed for zero or more times, until a value of state satisfies one of the following two conditions.

(i) $s'=0$ ($s'\leftarrow g(state, a)$, and 0 represents the initial state).

(ii) $s'\neq fail$ (since $g(0, a)\neq fail$, the appropriate state value can always be found), and one input symbol b making $g(s', b)\neq fail$ and $g(s, b)=fail$ exists (since $g(0, b)\neq fail$, the appropriate state value can always be found); or $s'\neq fail$, state=0, $s'=0$ is directly set.

(c) $f(s)=s'$ is set, that is, s' is used as the value of the Failure function of state s having the depth of d.

Through step (b), it is ensured that the acceptable input set of s' is not the subset of the acceptable input set of s, so as to prevent low efficient Failure links from being generated when the Failure function is constructed.

Figure 6A:
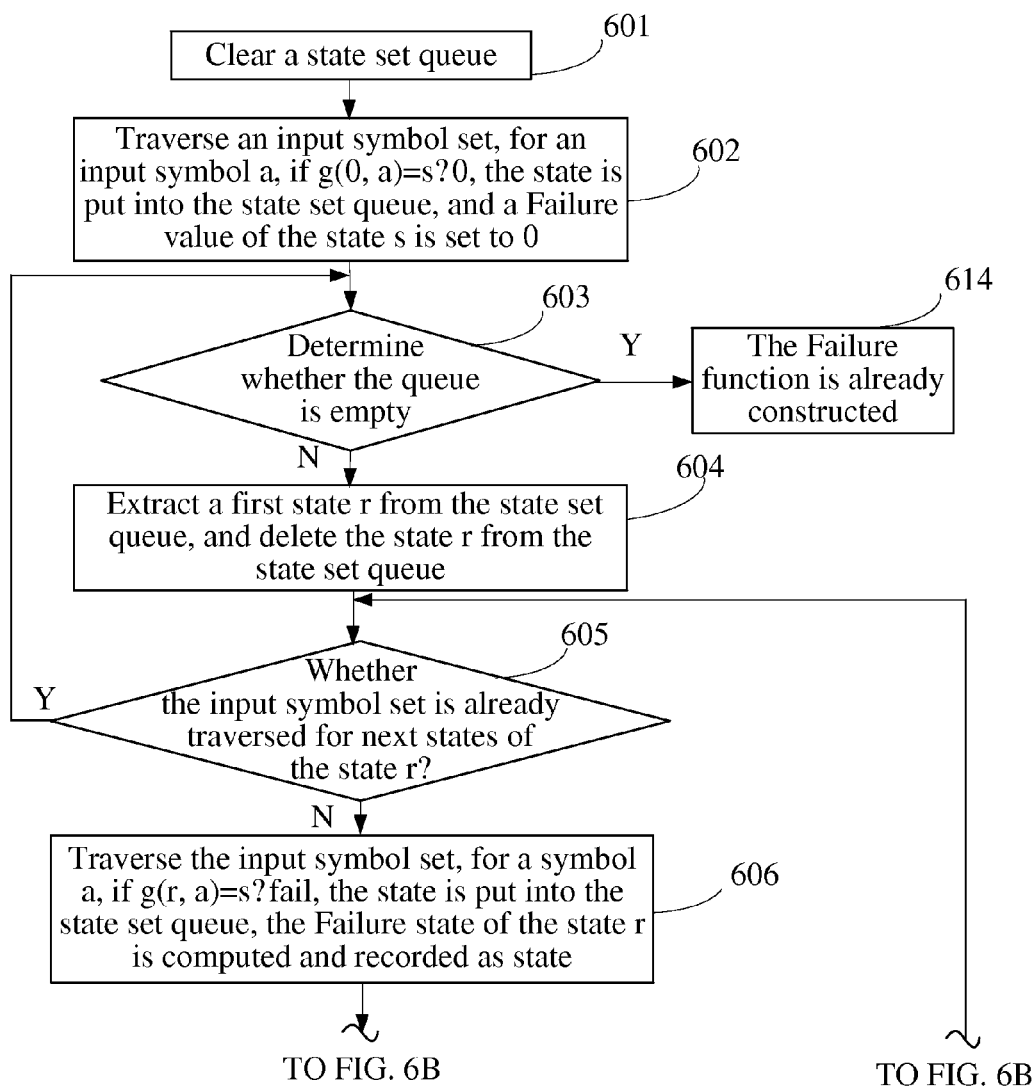
FIG. 6 is a flow chart of generating a Failure function according to an embodiment of the present invention.
Figure 6B:
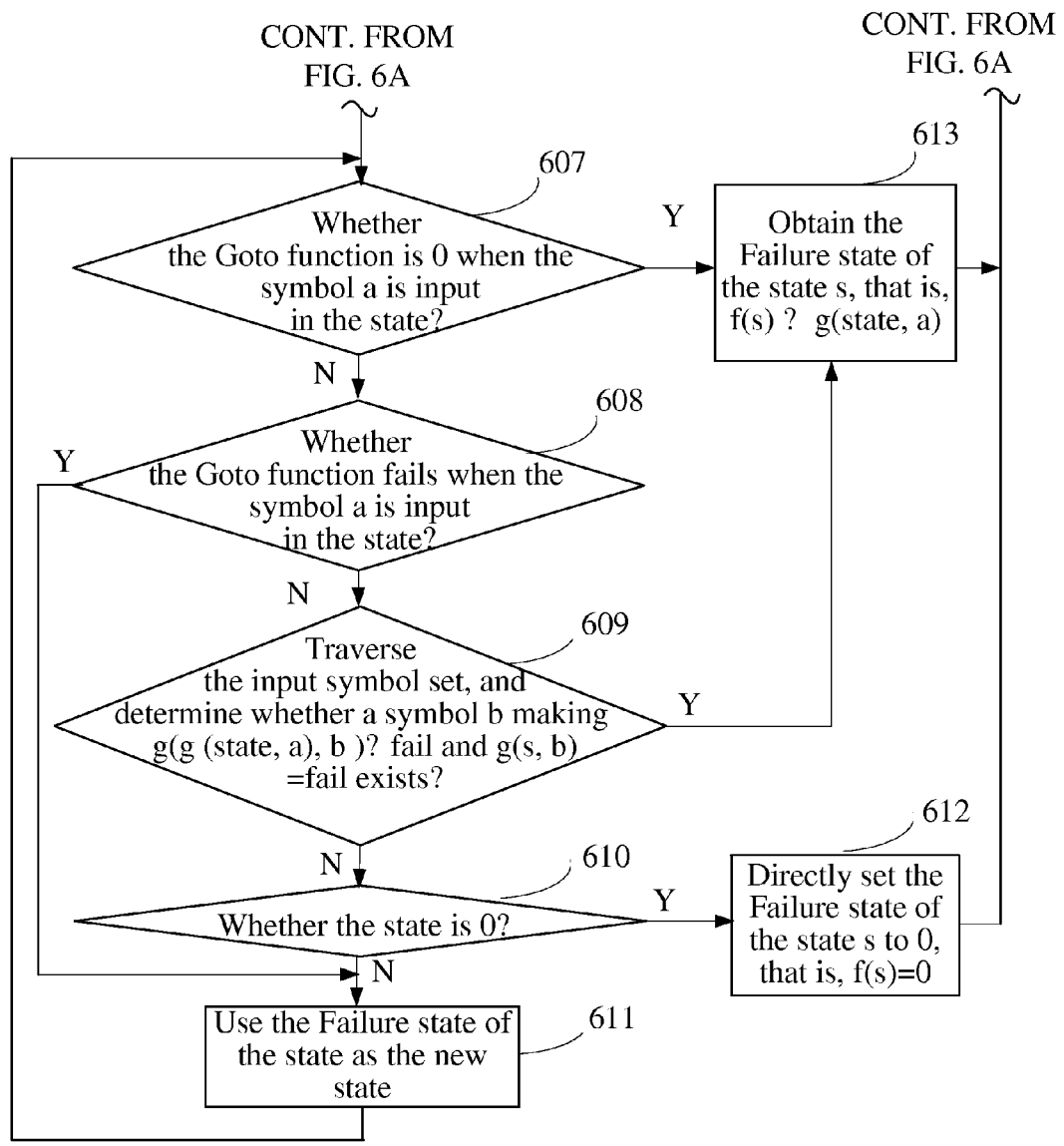

In the following, the procedure for implementing the Failure function through a specific program is described. For the state set, the Failure state of each state is computed one by one in a queue mode, which is completed through the process as shown in FIG. 6. The process includes the following steps.

In step 601, a state set queue is defined and cleared.

In step 602, an input symbol set is traversed, in which the input symbol set includes all the input symbols that can be used by the pattern matching state machine. The input symbol may be a symbol including a single character, or a symbol including a plurality of characters. For ease of description, in this embodiment, the symbol including the single character is taken as an example. For example, for a symbol a in the input symbol set, if $g(0, a)=s\neq 0$, the state is put into the state set queue, and a Failure value of state s is set to 0. The step is a loop procedure, by traversing the input symbol set, all the states having the depth of 1 may be found and put into the state set queue, and the Failure state thereof is set to state 0.

In step 603, the state set queue is traversed. If the queue is empty here, step 614 is executed; otherwise, step 604 is executed.

In step 604, a first state is extracted from the state set queue for processing, and the state is deleted from the state set queue. In the following, state r is taken as an example.

In step 605, the input symbol set is traversed to find a next state of state r. If the input symbol set is already traversed for state r, the process returns to step 603; otherwise, the process proceeds to step 606.

In step 606, for a symbol a in the symbol set, if $g(r, a)=s\neq fail$, it indicates that the next state of the r state in the state machine is s, so state s is put into the state set queue, for subsequently processing the next state of state s. The Failure state of state r is already generated in the previous process, and is recorded by using the variable state.

In step 607, it is determined whether the Goto function is 0 when the symbol a is input in the state, and if yes, the process proceeds to step 613; otherwise, the process proceeds to step 608.

In step 608, it is determined whether the Goto function fails when the symbol a is input in the state.

Since f(s)=g(state, a), the value of f(s) should be a meaningful state, and cannot fail. It is pre-determined whether g(state, a) fails. If yes, the goto fails, and the process proceeds to step 611; otherwise, the process proceeds to step 609.

In step 609, it is determined whether the acceptable input set of state s' is the subset of the acceptable input set of state s. If yes, the goto of a certain symbol fails in state s, and definitely fails in state s', so state s' cannot be used as the Failure state of state s, and the process proceeds to step 610; otherwise, the process proceeds to step 613.

For s'=g(state, a), whether the acceptable input set of state s' is the subset of the acceptable input set of state s can be determined as follows.

The input symbol set is traversed, and it is determined whether a symbol b making g(g (state, a), b)≠fail but g(s, b)=fail exists. If the symbol b exists, it indicates that the acceptable input set of state s' is not the subset of the acceptable input set of state s; otherwise, it indicates that the subset exists.

In step 610, it is determined whether the state is 0. If yes, the process proceeds to step 612; otherwise, the process proceeds to step 611.

In step 611, if a certain state cannot be used as the Failure state of another state, it should jump to the Failure state of the state for attempt, that is, the Failure state of the state is used as the new state for attempt, and then the procedure returns to step 607 for continuing the determination.

In step 612, the Failure state of state s is directly set to 0, that is, f(s)=0. Then, the procedure returns to step 605 to search for other next states of state r.

In step 613, the Failure state of state s is obtained, that is, f(s)←g(state, a). Then, the procedure returns to step 605 to search for other next states of state r.

In step 614, the state set queue is empty, indicating that all the states of the state machine are already processed, and the Failure function is already constructed.

It should be noted that in the process, the input symbols a and b indicate any symbol in the input symbol set, but do not particularly refer to the indicated symbols a and b.

Persons of ordinary skill in the art should understand that all or a part of the steps of the method according to the embodiments of the present invention may be implemented by a program instructing relevant hardware. The program may be stored in a computer readable storage medium. The storage medium may be, for example, a ROM, a RAM, a magnetic disk, and an optical disk.

Figure 1:
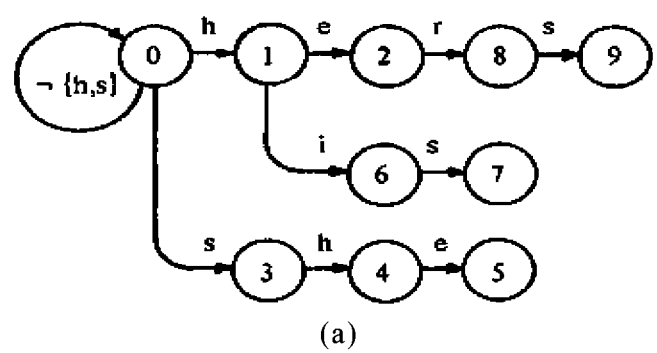
FIG. 1 is a schematic view of constructing Goto, Failure, and Output functions according to keywords in the art.
Figure 2:
FIG. 2 is a schematic view of a procedure of generating a conventional finite state machine.
Figure 2:
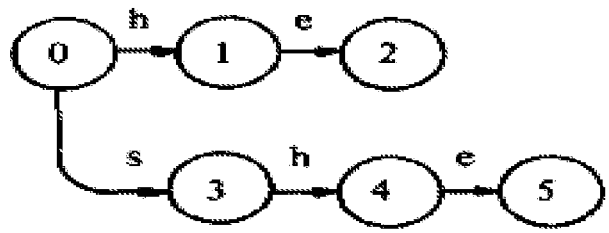
Figure 2:
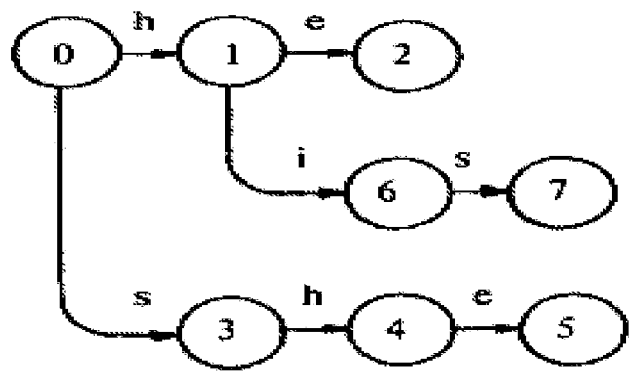
Figure 2:
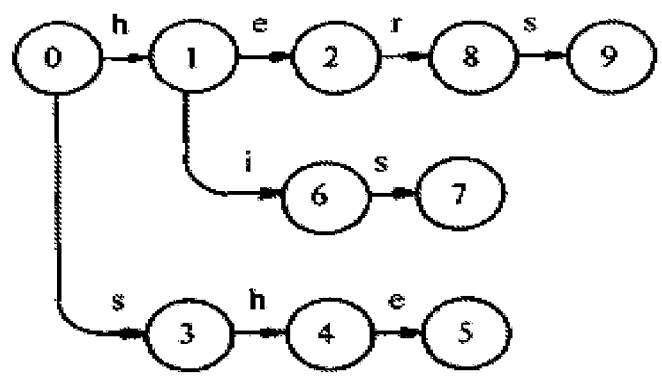
Figure 3:
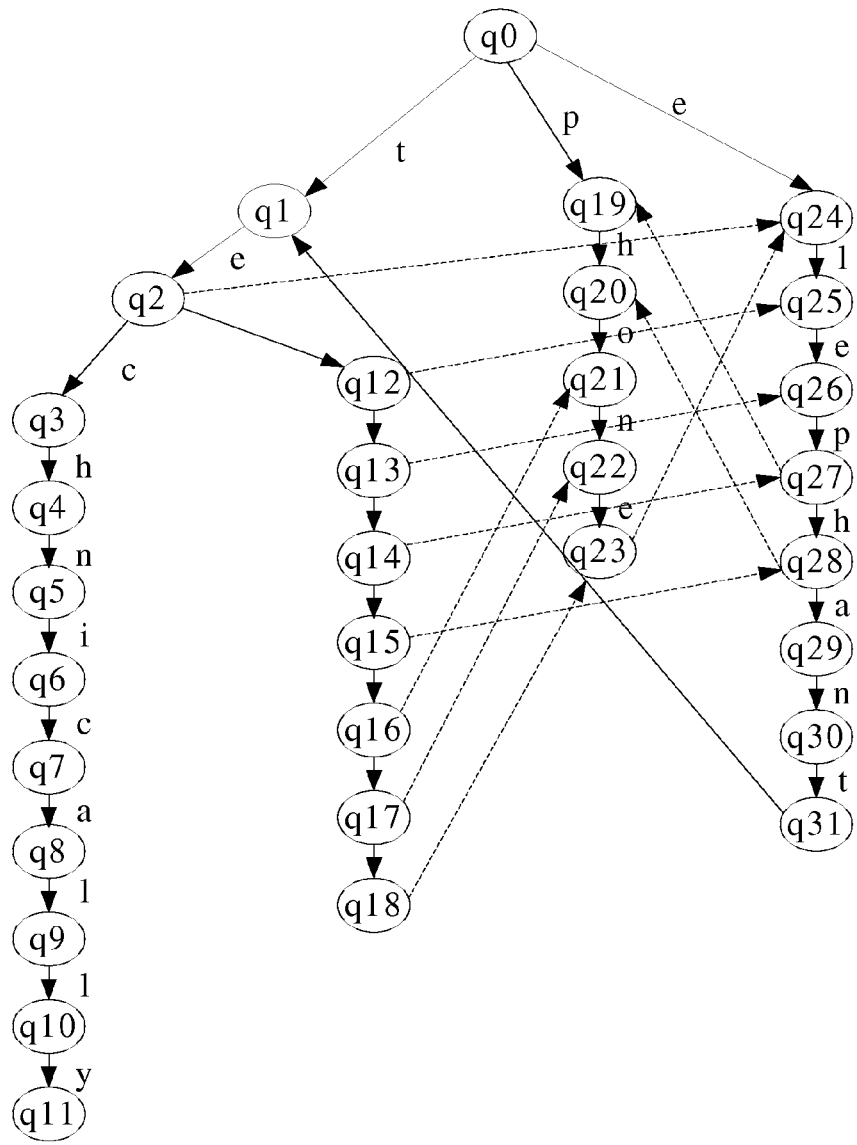
FIG. 3 is a schematic view of a conventional complicated state machine.
Figure 4:
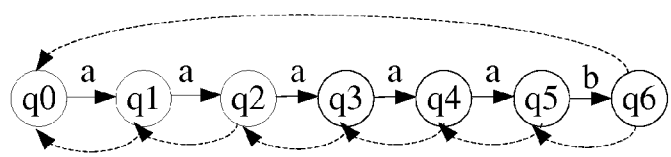
FIG. 4 is a schematic view of conventional low efficient Failure links.

In the following, the Failure links as shown in FIG. 4 are taken for example to compare the Failure results generated by using the conventional art and the method according to the present invention, so as to further describe the effect of reducing the low efficient Failure links through the method according to the present invention.

The computation results are listed in Table 1.

TABLE 1

| Step | Failure result of the existing algorithm | Failure result of the algorithm of the present invention |
|---|---|---|
| 1. The Failure state of all states having the depth of 1 is set to the initial state | f(q1) = q0 | f(q1) = q0 |
| 2. The Failure state of the state having the depth of 2 is generated | state = f(q1) = q0, f(q2) = g(q0, a) = q1 | state = f(q1) = q0, s' = g(state, a) = q1 ≠ fail, since the acceptable input sets of q1 and q2 are {a}, b making g(s', b) ≠ fail and g(s, b) = fail does not exist, and state = f(q1) = q0, so s' = q0 is directly set, and f(q2) = q0 is obtained |
| 3. The Failure state of the state having the depth of 3 is generated | state = f(q2) = q1, f(q3) = g(q1, a) = q2 | state = f(q2) = q1, and any condition of (i) and (ii) is not satisfied, so state←f(state) = f(q1) = q0 is executed. It may be known from step 2 that q1 satisfies condition (ii), so s' = 0 is directly set, and f(q3) = s' = 0 is obtained |
| 4. The Failure state of the state having the depth of 4 is generated | state = f(q3) = q2, f(q4) = g(q2, a) = q3 | state = f(q3) = q2, and any condition of (i) and (ii) is not satisfied, so state←f(state) = f(q2) = q1 is satisfied, and referring to step 3, f(q4) = q0 is obtained. |
| 5. The Failure state of the state having the depth of 5 is generated | state = f(q4) = q3, f(q5) = g(q3, a) = q4 | state = f(q4) = q3, s' = g(state, a) = q4 ≠ fail, the input symbol a making g(q4, a) ≠ fail but g(q5, a) = fail exists, the condition (ii) is satisfied, so f(q5) = q4 |
| 6. The Failure state of the state having the depth of 6 is generated | state = f(q5) = q4, since g(q4, b) = fail, state = f(state) = f(q4) = q3 is executed. Since g(q3, b) = fail, state = f(state) = f(q3) = q2 is executed. Since g(q2, b) = fail, state = f(state) = f(q2) = q1 is executed. Since g(q1, b) = fail, state = f(state) = f(q1) = q0 is executed f(q6) = g(state, b) = g(q0, b) = q0. | state = f(q5) = q4, since g(q4, b) = fail, state = f(state) = f(q4) = q3 is executed. Since g(q3, b) = fail, state = f(state) = f(q3) = q2 is executed. Since g(q2, b) = fail, state = f(state) = f(q2) = q1 is executed. Since g(q1, b) = fail, state = f(state) = f(q1) = q0 is executed. f(q6) = g(state, b) = g(q0, b) = q0 |

Figure 7:
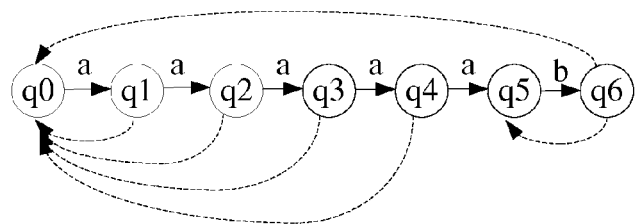
FIG. 7 is a schematic view of Failure links corresponding to FIG. 4 generated by using the method according to an embodiment of the present invention.

Corresponding to the Failure links generated in the conventional art as shown in FIG. 4, the Failure links generated by using the method according to the present invention are as shown in FIG. 7.

In the above embodiment, the symbol including the single character is taken as an example for describing the procedure of implementing the Failure function in detail. However, the present invention is not limited to the situation, and is also applicable to the situation of the symbol including a plurality of input characters.

It can be known that, when the pattern matching state machine is created by using the method according to the embodiments of the present invention, the low efficient Failure links are greatly reduced, and the pattern matching processing efficiency is improved.

Figure 8:
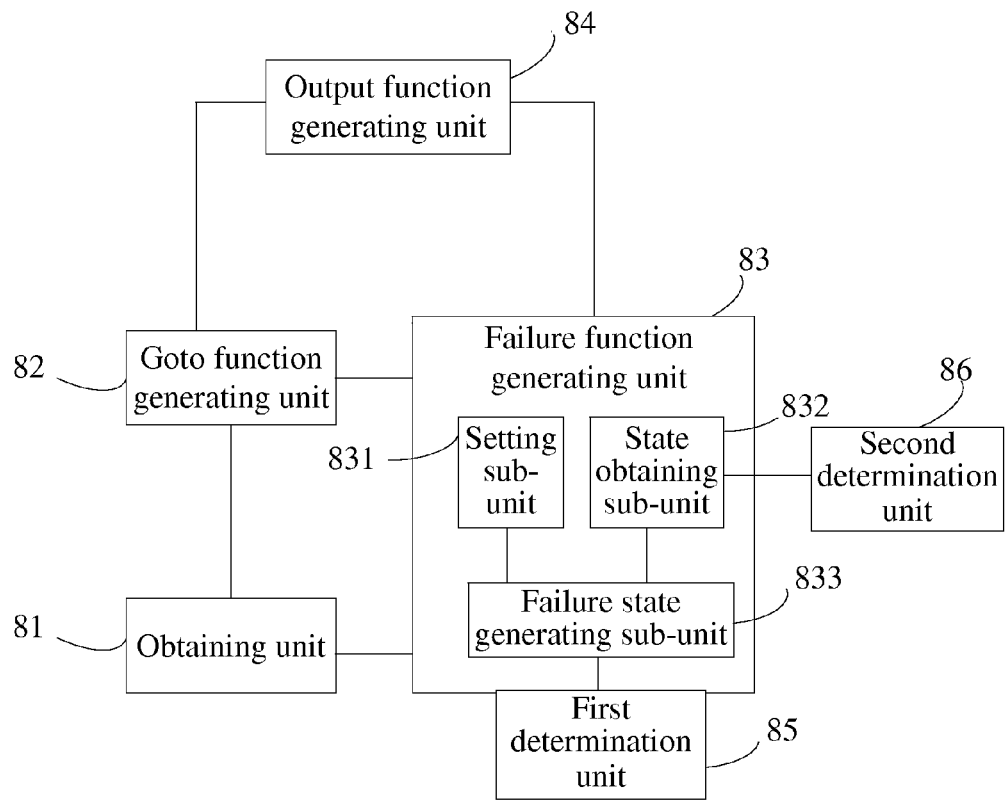
FIG. 8 is a principle block diagram of a device for creating a pattern matching state machine according to an embodiment of the present invention.

In an embodiment, the present invention further provides a device for creating a pattern matching state machine. Referring to FIG. 8, the device includes an obtaining unit 81, a Goto function generating unit 82, a Failure function generating unit 83, and an Output function generating unit 84. The obtaining unit 81 is adapted to obtain a predefined keyword set. The Goto function generating unit 82 is adapted to generate a Goto function according to the keyword set. The Failure function generating unit 83 is adapted to construct a Failure function according to the generated Goto function, and set that an acceptable input set of a Failure state of each state is not a subset of an acceptable input set of the state, where the acceptable input set of the state indicates that when any symbol within the symbol set is input in the state, the Goto function of the state does not fail. The Output function generating unit 84 is adapted to generate an Output function according to the Goto function and the Failure function.

As shown in FIG. 8, in an embodiment of the present invention, the Failure function generating unit 83 includes a setting sub-unit 831, a state obtaining sub-unit 832, and a Failure state generating sub-unit 833. The setting sub-unit 831 is adapted to set a Failure state of all states having a depth of 1 to an initial state. The state obtaining sub-unit 832 is adapted to obtain a Failure state of a previous state r having a depth of d-1 as a current state in sequence. The Failure state generating sub-unit 833 is adapted to traverse the input symbol set, determine whether the Goto function fails when the input symbols are input in the current state, and determine whether an acceptable input set of a goto state obtained through the Goto function when the input symbols are input in the current state is a subset of an acceptable input set of state s; continue the determination by using the Failure state of the current state as the new current state if the Goto function fails when the input symbols are input in the current state, or the acceptable input set of the goto state obtained through the Goto function when the input symbols are input in the current state is the subset of the acceptable input set of the current state s having the depth d; use a value of the Goto function when the input symbols are input in the current state as the Failure state of state s having the depth of d if the Goto function does not fail when the input symbols are input in the current state, and the acceptable input set of the goto state obtained through the Goto function when the input symbols are input in the current state is not the subset of the acceptable input set of state s; and end processing state r if the Goto function fails when all the input symbols are input in state r.

The Failure state generating sub-unit 833 determines whether the acceptable input set of the goto state obtained through the Goto function when the input symbols are input in the current state is the subset of the acceptable input set of the state s as follows.

Traverse the input symbol set, and determine that the acceptable input set of the goto state obtained through the Goto function when the input symbols are input in the current state is not the subset of the acceptable input set of state s if a symbol b satisfying the conditions g(g (state, a), b)≠fail and g(s, b)=fail exists, in which a is an input symbol in state r having the depth of d-1; otherwise, determine that the acceptable input set of the goto state obtained through the Goto function when the input symbols are input in the current state is the subset of the acceptable input set of state s.

As shown in FIG. 8, the device of creating the pattern matching state machine according to the embodiment further includes a first determination unit 85, adapted to use the value of the Goto function when the input symbols are input in the current state as the Failure state of state s having the depth of d if determining that the Goto function is 0 when the input symbols are input in the current state. In addition, the device further includes a second determination unit 86, adapted to directly set the Failure state of state s having the depth of d to 0, when determining that the Goto function does not fail when the input symbols are input in the current state, the acceptable input set of the goto state obtained through the Goto function when the input symbols are input in the current state is the subset of the acceptable input set of state s, and the current state is 0.

The specific procedure of creating the pattern matching state machine by using the device according to the present invention is similar to the description of the method according to the present invention, so it is not described in detail here.

The pattern matching state machine created by using the device according to the present invention eliminates the low efficient Failure links in the pattern matching state machine, and improves the pattern matching processing efficiency.

The embodiments of the present invention are described in detail above. The present invention is described herein through specific implementations. The description about the embodiments of the present invention is merely provided for ease of understanding of the device and the method of the present invention. Persons of ordinary skill in the art can make variations and modifications to the present invention in terms of the specific implementations and application scopes according to the ideas of the present invention. Therefore, the specification shall not be construed as limitations to the present invention.

What is claimed is:

1. A method for creating a pattern matching state machine, comprising:

obtaining a predefined keyword set;

generating a Goto function according to the keyword set;

constructing a Failure function according to the generated Goto function, and setting that an acceptable input set of a Failure state of each state is not a subset of an acceptable input set of the state, wherein the acceptable input set of the state indicates that when any symbol within the symbol set is input in the state, the Goto function of the state does not fail; and generating an Output function according to the Goto function and the Failure function;

wherein the constructing the Failure function according to the generated Goto function comprises:

setting the Failure state of all states having a depth of 1 to an initial state, and indicating the initial state with state 0;

executing the following steps on state r having a depth of d-1 in sequence, for determining the Failure state of state s having a depth of d:

obtaining the Failure state of state r having the depth of d-1 as a current state, and executing the following steps:
- traversing the input symbol set, determining whether the Goto function fails when the input symbols are input in the current state, and determining whether an acceptable input set of a goto state obtained by the Goto function when the input symbols are input in the current state is a subset of an acceptable input set of state s, wherein the input symbol set comprises all the input symbol capable of being used by the pattern matching state machine;
- continuing the determination step by using the Failure state of the current state as the new current state, if the Goto function fails when the input symbols are input in the current state, or the acceptable input set of the goto state obtained through the Goto function when the input symbols are input in the current state is the subset of the acceptable input set of state s;
- using a value of the Goto function when the input symbols are input in the current state as the Failure state of state s having the depth of d if the Goto function does not fail when the input symbols are input in the current state, and the acceptable input set of the goto state obtained through the Goto function when the input symbols are input in the current state is not the subset of the acceptable input set of state s; and
- ending processing state r, if the Goto function fails when all the input symbols are input in state r.

2. The method according to claim 1, wherein the determining whether the acceptable input set of the goto state obtained through the Goto function when the input symbols are input in the current state is the subset of the acceptable input set of state s comprises:
traversing the input symbol set, determining that the acceptable input set of the goto state obtained through the Goto function when the input symbols are input in the current state is not the subset of the acceptable input set of state s, if a symbol b satisfying conditions g(g (state, a), b)≠fail and g(s, b)=fail exists, wherein a is an input symbol in state r having the depth of d-1; otherwise, determining that the acceptable input set of the goto state obtained through the Goto function when the input symbols are input in the current state is the subset of the acceptable input set of state s.

3. The method according to claim 1, further comprising:
using the value of the Goto function when the input symbols are input in the current state as the Failure state of state s having the depth of d if the value of the Goto function is 0 when the input symbols are input in the current state.

4. The method according to claim 2, further comprising:
using the value of the Goto function when the input symbols are input in the current state as the Failure state of state s having the depth of d if the value of the Goto function is 0 when the input symbols are input in the current state.

5. The method according to claim 1, further comprising:
directly setting the Failure state of state s having the depth of d to 0, if the Goto function does not fail when the input symbols are input in the current state, and the acceptable input set of the goto state obtained through the Goto function when the input symbols are input in the current state is the subset of the acceptable input set of state s, and the current state is 0.

6. The method according to claim 2, further comprising:
directly setting the Failure state of state s having the depth of d to 0, if the Goto function does not fail when the input symbols are input in the current state, and the acceptable input set of the Goto state obtained through the Goto function when the input symbols are input in the current state is the subset of the acceptable input set of state s, and the current state is 0.

7. A device of creating a pattern matching state machine, comprising:
one or more processors; and
a memory for storing instructions, which, when executed by the one or more processors, cause the one or more processors to:
obtain a predefined keyword set;
generate a Goto function according to the keyword set;
construct a Failure function according to the generated Goto function, and set that an acceptable input set of a Failure state of each state is not a subset of an acceptable input set of the state, wherein the acceptable input set of the state indicates that when any symbol within the symbol set is input in the state, the Goto function of the state does not fail; and
generate an Output function according to the Goto function and the Failure function;
wherein when the instructions cause the one or more processors to construct the Failure function according to the generated Goto function, the one or more processors are further configured to:
set the Failure state of all states having a depth of 1 to an initial state;
obtain a Failure state of a previous state r having a depth of d-1 as a current state in sequence;
traverse the input symbol set, determine whether the Goto function fails when the input symbols are input in the current state, and determine whether an acceptable input set of a goto state obtained through the Goto function when the input symbols are input in the current state is a subset of an acceptable input set of state s; continue determination by using the Failure state of the current state as the new current state, if the Goto function fails when the input symbols are input in the current state, or the acceptable input set of the goto state obtained through the Goto function when the input symbols are input in the current state is the subset of the acceptable input set of the current state s having the depth d; use a value of the Goto function when the input symbols are input in the current state as the Failure state of state s having the depth of d, if the Goto function does not fail when the input symbols are input in the current state, and the acceptable input set of the goto state obtained by the Goto function when the input symbols are input in the current state is not the subset of the acceptable input set of state s; and end processing state r, if the Goto function fails when all the input symbols are input in state r.

8. The device according to claim 7, wherein the instructions cause the one or more processors to determine whether the acceptable input set of the goto state obtained through the Goto function when the input symbols are input in the current state is the subset of the acceptable input set of state s, the one or more processors are further configured to:
traverse the input symbol set, determine that the acceptable input set of the goto state obtained through the Goto function when the input symbols are input in the current state is not the subset of the acceptable input set of state s, if a symbol b satisfying condition g(g (state, a), b)≠fail and g(s, b)=fail exists, wherein a is an input symbol in state r having the depth of d-1; otherwise, determine that the acceptable input set of the goto state obtained through the Goto function when the input symbols are input in the current state is the subset of the acceptable input set of states.

9. The device according to claim 7, wherein the instructions further cause the one or more processors to:
use the value of the Goto function when the input symbols are input in the current state as the Failure state of state s having the depth of d, when determining that the Goto function is 0 when the input symbols are input in the current state.

10. The device according to claim 8, wherein the instructions further cause the one or more processors to:
use the value of the Goto function when the input symbols are input in the current state as the Failure state of state s having the depth of d, when determining that the Goto function is 0 when the input symbols are input in the current state.

11. The device according to claim 7, wherein the instructions further cause the one or more processors to:
directly set the Failure state of state s having the depth of d to 0 when determining that the Goto function does not fail when the input symbols are input in the current state, the acceptable input set of the goto state obtained through the Goto function when the input symbols are input in the current state is the subset of the acceptable input set of state s, and the current state is 0.

12. The device according to claim 8, wherein the instructions further cause the one or more processors to:
directly set the Failure state of state s having the depth of d to 0 when determining that the Goto function does not fail when the input symbols are input in the current state, the acceptable input set of the Goto state obtained through the Goto function when the input symbols are input in the current state is the subset of the acceptable input set of state s, and the current state is 0.

\* \* \* \* \*